(12) United States Patent
Lindsay

(10) Patent No.: US 9,959,687 B2
(45) Date of Patent: May 1, 2018

(54) DRIVER BEHAVIOR MONITORING

(71) Applicant: John Lindsay, Dallas, TX (US)

(72) Inventor: John Lindsay, Dallas, TX (US)

( * ) Notice: Subject to any disclaimer, the term of this patent is extended or adjusted under 35 U.S.C. 154(b) by 16 days.

(21) Appl. No.: 15/287,526

(22) Filed: Oct. 6, 2016

(65) Prior Publication Data

US 2017/0024938 A1 Jan. 26, 2017

Related U.S. Application Data

(63) Continuation of application No. 14/710,553, filed on May 12, 2015, which is a continuation of application No. PCT/US2014/030086, filed on Mar. 15, 2014.

(60) Provisional application No. 61/792,148, filed on Mar. 15, 2013, provisional application No. 61/825,068, filed on May 19, 2013.

(51) Int. Cl.
| | |
|---|---|
| *B60Q 1/00* | (2006.01) |
| *G07C 5/02* | (2006.01) |
| *G01S 19/01* | (2010.01) |
| *G01C 21/16* | (2006.01) |
| *G01C 21/26* | (2006.01) |
| *G08G 1/0967* | (2006.01) |
| *H04B 10/112* | (2013.01) |
| *B60W 40/10* | (2012.01) |
| *G08G 1/0962* | (2006.01) |
| *G08G 1/00* | (2006.01) |
| *H04W 84/00* | (2009.01) |
| *H04W 84/18* | (2009.01) |

(Continued)

(52) U.S. Cl.
CPC ............. *G07C 5/02* (2013.01); *B60W 40/10* (2013.01); *G01C 21/16* (2013.01); *G01C 21/26* (2013.01); *G01S 19/01* (2013.01); *G08G 1/0962* (2013.01); *G08G 1/096716* (2013.01); *G08G 1/096758* (2013.01); *G08G 1/096791* (2013.01); *G08G 1/165* (2013.01); *G08G 1/166* (2013.01); *G08G 1/22* (2013.01); *H04B 10/1123* (2013.01); *H04B 10/1129* (2013.01); *H04W 84/005* (2013.01); *H04W 84/18* (2013.01); *B60Q 1/525* (2013.01); *G08G 1/162* (2013.01)

(58) Field of Classification Search
CPC ...... G08G 5/0039; G08G 1/161; G06Q 40/08; G06Q 30/02; G06Q 30/0224; G01C 21/3697; G01C 21/3469; G01C 21/30
USPC .................. 340/425.5, 905; 701/1, 533, 532
See application file for complete search history.

(56) References Cited

U.S. PATENT DOCUMENTS

| | | | |
|---|---|---|---|
| 5,446,470 A | 8/1995 | Avignon et al. | |
| 7,525,568 B2 * | 4/2009 | Raghunath | H04N 5/782 340/539.21 |

(Continued)

*Primary Examiner* — Hoi Lau
(74) *Attorney, Agent, or Firm* — John Lindsay

(57) ABSTRACT

Exemplary embodiments of the present invention are directed to a system for monitoring, recording, and analyzing driver activity. An exemplary system comprises a sensor module configured to receive data from one or more sensors that measure acceleration or deceleration associated with a vehicle. A stop detection module is configured to receive the sensor module data, process the sensor module data, and determine an abrupt acceleration or deceleration event. A location module is configured to retrieve the location of the vehicle simultaneous with an abrupt acceleration or deceleration event. The system stores the location of the abrupt acceleration or deceleration event in an event record in an event database.

8 Claims, 15 Drawing Sheets

(51) Int. Cl.
*B60Q 1/52* (2006.01)
*G08G 1/16* (2006.01)

(56) References Cited

U.S. PATENT DOCUMENTS

| | | | | |
|---|---|---|---|---|
| 8,285,424 | B2* | 10/2012 | Nakajima | B60W 50/045 |
| | | | | 348/148 |
| 2004/0215373 | A1* | 10/2004 | Won | G08G 1/161 |
| | | | | 701/1 |
| 2005/0278118 | A1* | 12/2005 | Kim | G01C 21/26 |
| | | | | 701/469 |
| 2007/0008234 | A1 | 1/2007 | Capps et al. | |
| 2007/0168125 | A1* | 7/2007 | Petrik | B60R 16/0231 |
| | | | | 701/469 |
| 2009/0112463 | A1* | 4/2009 | Yamane | G01C 21/3469 |
| | | | | 701/533 |
| 2009/0140921 | A1 | 6/2009 | Bongfeldt et al. | |
| 2010/0052945 | A1 | 3/2010 | Breed | |
| 2010/0131303 | A1* | 5/2010 | Collopy | G06Q 30/0224 |
| | | | | 705/4 |
| 2010/0241353 | A1* | 9/2010 | Park | G01C 21/30 |
| | | | | 701/532 |
| 2012/0242511 | A1* | 9/2012 | Morgan | B60R 25/04 |
| | | | | 340/989 |
| 2012/0299373 | A1 | 11/2012 | Yoshida | |
| 2013/0211618 | A1* | 8/2013 | Iachini | G06Q 30/02 |
| | | | | 701/1 |
| 2013/0317665 | A1* | 11/2013 | Fernandes | G08G 5/0039 |
| | | | | 701/1 |
| 2014/0121857 | A1* | 5/2014 | Iachini | B60R 25/20 |
| | | | | 701/1 |
| 2014/0343814 | A1* | 11/2014 | Byun | B60K 26/00 |
| | | | | 701/70 |
| 2015/0310742 | A1* | 10/2015 | Albornoz | G08G 1/096716 |
| | | | | 340/905 |
| 2016/0027305 | A1* | 1/2016 | Inaba | G01C 21/3697 |
| | | | | 340/905 |
| 2016/0343250 | A1* | 11/2016 | Yoshii | G08G 1/0141 |
| 2017/0024938 | A1* | 1/2017 | Lindsay | G07C 5/02 |
| 2017/0270617 | A1* | 9/2017 | Fernandes | G06Q 40/08 |

\* cited by examiner

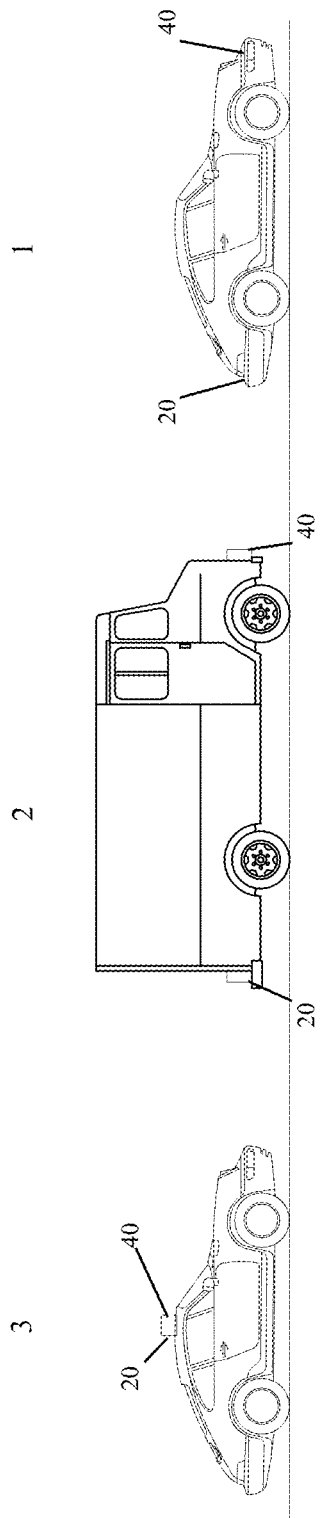

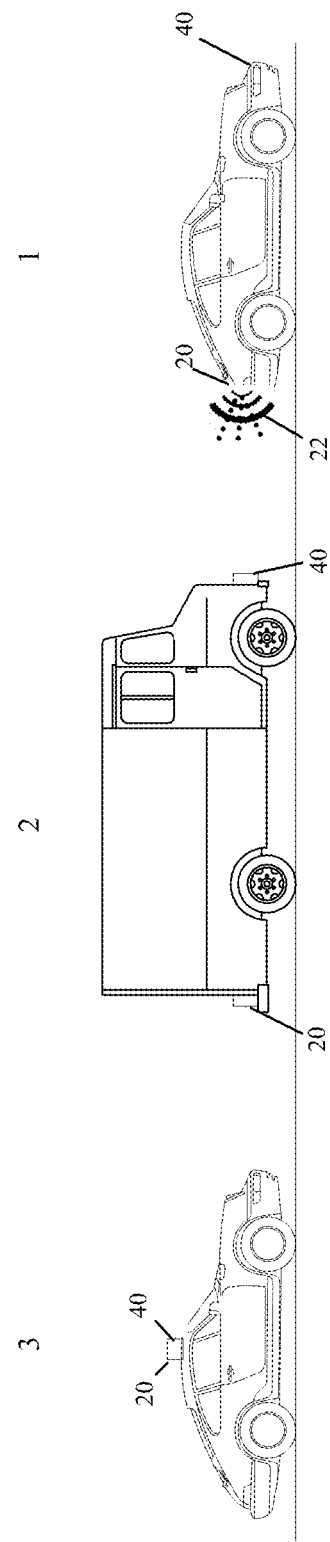

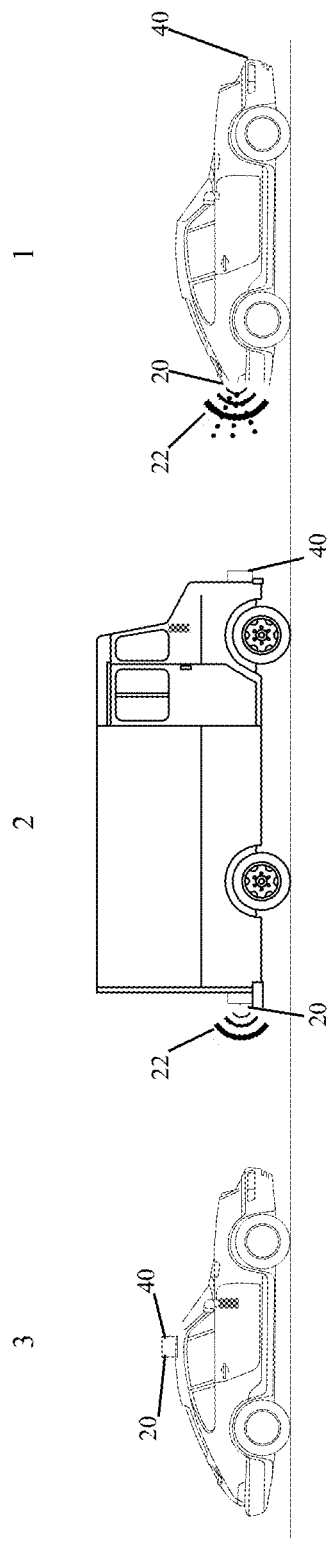

DRIVER BEHAVIOR MONITORING

PRIORITY

The present invention claims priority to U.S. patent application Ser. No. 14/710,553, which has a filing date of May 12, 2015. U.S. patent application Ser. No. 14/710,553 claims priority to PCT patent application PCT/US2014/030086, which has a filing date of Mar. 15, 2014. PCT patent application PCT/US2014/030086 claims priority to provisional application 61/792,148, which has a filing date of Mar. 15, 2013. PCT patent application PCT/US2014/030086 claims priority to provisional application 61/825,068, which has a filing date of May 19, 2013.

BACKGROUND

Field of the Invention

The present invention relates to vehicle activity monitoring systems, more specifically to systems for monitoring, recording, and analyzing vehicle activity.

Description of the Related Art

For certain driving conditions, communications from one vehicle to a subset of other proximate vehicles is desirable. Two such example situations are a braking or turn signal usage. In such situations, alerting vehicles outside the signaling vehicle's lane of travel would result in false alerts to those other vehicles.

In a braking situation, reaction time is one of the most significant factors in causes of rear-end vehicular collisions. Driver reaction times are greatly affected by whether the driver is alerted to the need to brake. In a representative problem scenario illustrated in FIG. 5a, there is a leading vehicle 1, a first trailing vehicle 2, and a second trailing vehicle 3. When the leading vehicle 1 directly ahead of the first trailing vehicle 2 stops, the driver of the first trailing 2 vehicle is alert, visual conditions are excellent, and the driver notices the brake signal or turn signal of the leading vehicle 1, the best possible reaction time is achieved. However, where the second trailing vehicle 3 is further behind and obscured by the first trailing vehicle 2, the driver of that second trailing vehicle 3 is unable to see the braking or other signal lights of that leading vehicle 1. That driver must rely on the reaction time and driving style of the vehicles between him and the leading vehicle 1 and rely on the driver of the intervening first trailing vehicle 2 in order to maximize reaction time and apply the brakes at the earliest possible opportunity.

Even where there is no intervening vehicle, it may not be possible for the first trailing vehicle's 2 driver to see the signal lights of a vehicle directly in front of the driver under poor visual conditions such as fog or heavy rain.

In such cases, the driver loses valuable time needed to interpret the event, decide upon the response, and then apply brakes, steer, or other suitable response. To a great extent, available reaction time depends on the distance of the lead vehicle 1 to the trailing vehicles 2 3 when it activates its signal light. Differences in drivers' attention and reaction time in tenths of a second or lower can limit accidents and decrease high stress driving.

These problems are exaggerated in congestion zones or peak driving times, leading to frequent hard stopping, frequent acceleration, and a poor driving experience. Hard acceleration or braking is a driver event when more force than normal is applied to the vehicle's brake or accelerator. It can be an indicator of aggressive or unsafe driving. It can also arise from road design and traffic patterns. At a minimum, this style of driving is wasteful and uneconomic. Furthermore, it should also be noted that hard braking and acceleration events can also indicate crash avoidance, or that a driver has been involved in an accident. Thus it would be desirable for a system which enables change of driver behavior in order to minimize such situations.

SUMMARY

Exemplary embodiments of the present invention are directed to a system for monitoring, recording, and analyzing driver activity. An exemplary system comprises a sensor module configured to receive data from one or more sensors that measure acceleration or deceleration associated with a vehicle. A stop detection module is configured to receive the sensor module data, process the sensor module data, and determine an abrupt acceleration or deceleration event. A location module is configured to retrieve the location of the vehicle simultaneous with an abrupt acceleration or deceleration event. The system stores the location of the abrupt acceleration or deceleration event in an event record in an event database.

These and other features, aspects, and advantages of the invention will become better understood with reference to the following description, appended claims, and accompanying drawings.

BRIEF DESCRIPTION OF THE DRAWINGS

FIGS. 5a-5c illustrate side views of embodiments of the system as they may exist in operation;

DETAILED DESCRIPTION

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure, or manner.

Figure 1:
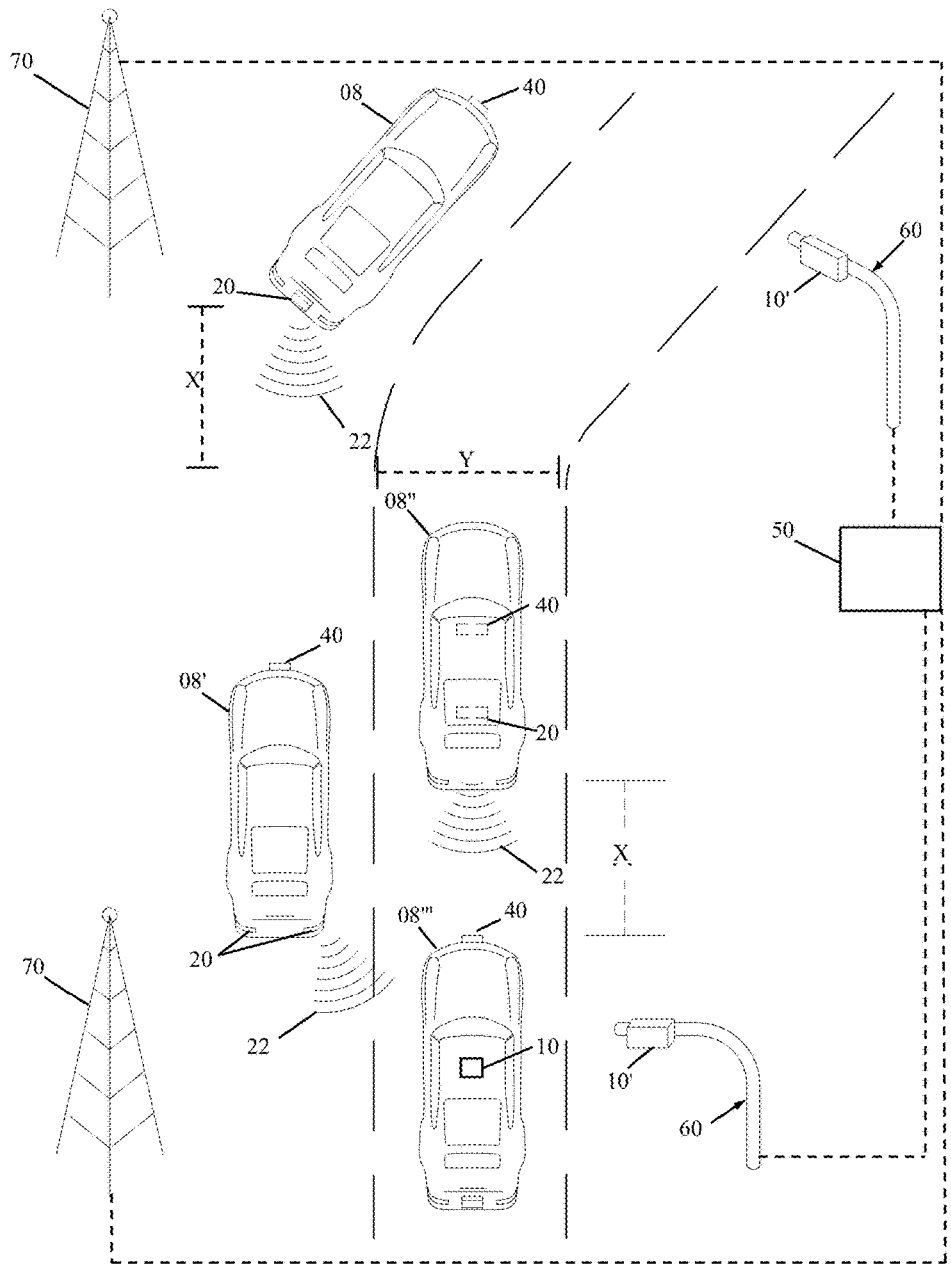
FIG. 1 illustrates a top view of embodiments of the invention as it may exist in operation.

The current invention relates to a device for directed vehicle to vehicle communication. A representative scenario is relaying a vehicle's signal condition to trailing vehicles in the same lane. FIG. 1 illustrates a plurality of vehicles 08 equipped with vehicle to vehicle communication systems 10 (shown separately in FIG. 3) as they may exist in operation. The vehicle to vehicle communication system 10 includes an emitter 20 and a receiver 40 for attachment to a single vehicle 08. As shown, the emitter 20 and receiver 40 can be configured for different spatial placement on a vehicle 08. They can be housed in a single unit 08''' for attachment to the vehicle ceiling or roof. The system 10 can be configured for receiver 40 placement on the front of the vehicle 08 08' or toward the front of the vehicle 08''. The vehicle to vehicle communication system 10 can be configured for emitter 20 placement on the rear of the vehicle 08 08' or toward the rear of the vehicle 08''.

Figure 2:
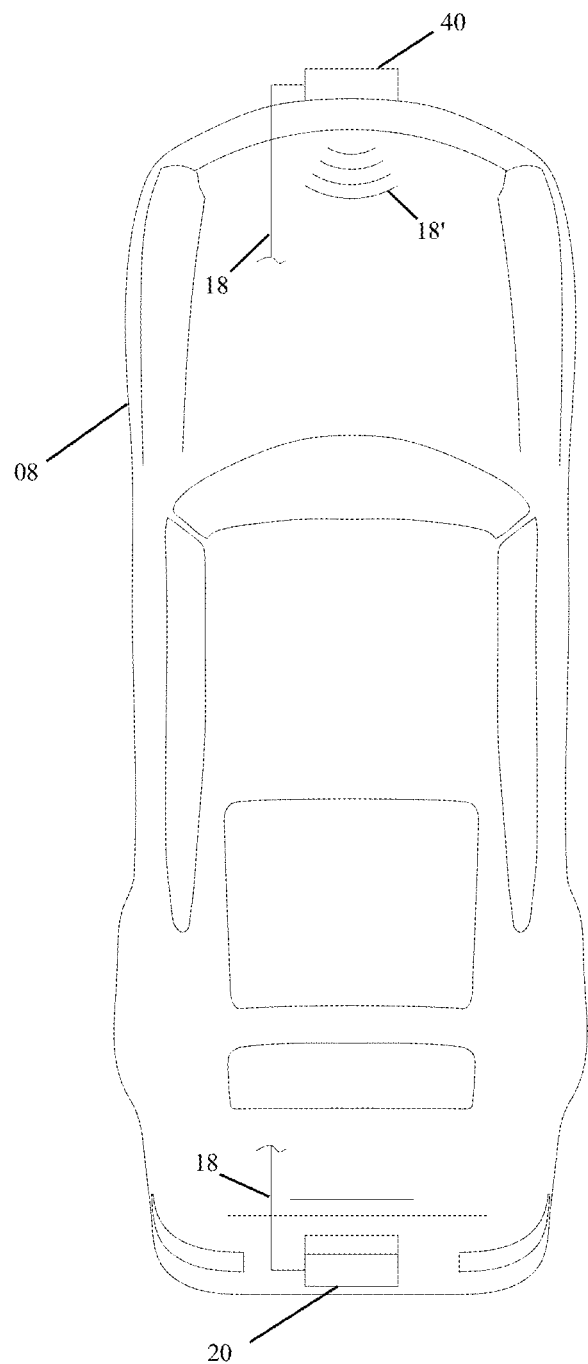
FIG. 2 illustrates a top view of an embodiment of the invention as it may exist in operation.
Figure 3:
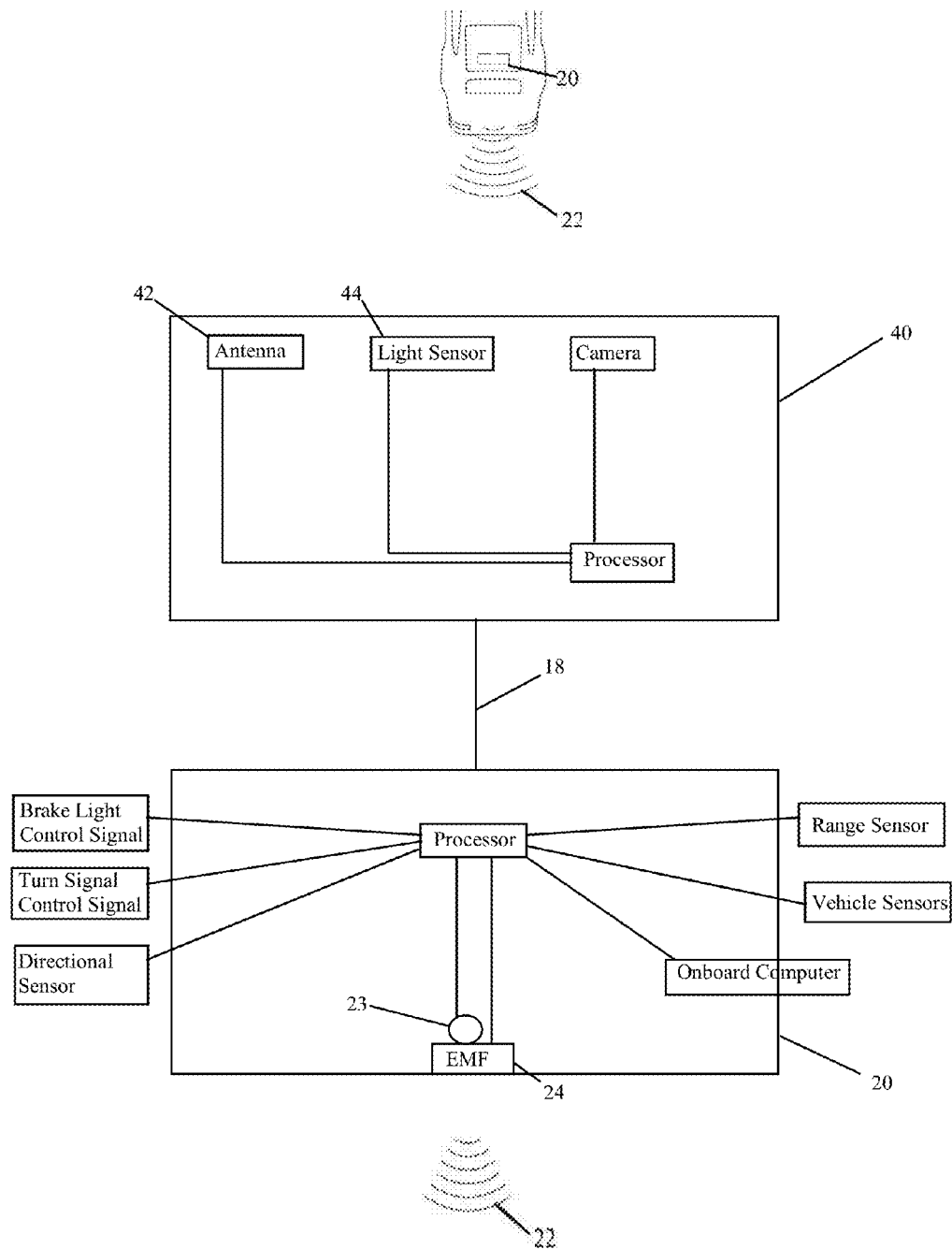
FIG. 3 illustrates a block diagram of the embodiment illustrated in FIG. 1.

FIG. 2 illustrates an embodiment of the vehicle to vehicle communication system 10 deployed to a vehicle 08. Depicted is an emitter 20 in communication with a receiver 40. FIG. 3 illustrates a block diagram of the embodiment of FIG. 2. The emitter 20 is operable to signal in response to threshold signal input to the receiver 40 or a signal use condition of the subject vehicle. A signal use condition is one in which a signal light is in use or its use is warranted. Exemplary signal use conditions include brake signal use or turn signal use. For example, a switch may be mounted inline with the signal for the brake light or turn signal in the vehicle. In an automated driving system, a control signal for a brake light or turn signal activation can be monitored. Alternatively, the emitter 20 can employ sensors to detect the use condition. In such a configuration, the emitter 20 can include a light sensor mounted proximate the signal light of the vehicle 08. When a driver of the vehicle 08 depresses the brake pedal or uses the turn signal switch, the vehicle 08 activates the corresponding signal light. The emitter 20 detects the control signal or the light therefrom. Another example signal condition is a road hazard such as a pothole.

In one configuration, the emitter 20 includes a configured visual signal. The exemplary signal is one which is different than current brake signals. Representative visual signals include selected shapes, colors, brightness, flashing sequences, unique indicia, or the like.

In an alternate configuration, the emitter 20 contains an electromagnetic radiation source 24, configured to transmit a directional beam 22 from the vehicle 08. In one configuration, the electromagnetic radiation source 24 includes a coherent light source such as a laser. In an alternate configuration, the electromagnetic radiation source 24 includes a light source such as a filament or LED. In yet another configuration, the electromagnetic radiation source 24 includes a radio wave source.

In exemplary configuration, to the extent that the electromagnetic radiation source 24 permits, the beam 22 width is transmitted such that it has less than a configured signal strength outside a configured width y and less than a configured signal strength at a pre-configured distance x for a given set of environmental conditions. In exemplary operation, the beam 22 width is less than about one traffic lane wide at distance x or has a lower signal strength outside the configured width. Beam 22 width is controlled using processes known in the art. In certain configurations, a laser is included. In other configurations, an LED or filament coupled with a lens is included. Radio frequency is controlled by using reflectors, antennae arrays, apertures, and/or specific wavelengths in order to control beam 22 width.

It is within the scope of this invention to vary the signal strength of the beam 22. For example, the signal strength can be altered in response to rain, fog, or other conditions which alter signal transmission. It is also within the scope of the invention to incorporate multiple electromagnetic radiation sources 24. In certain configurations, the emitter 20 energizes one or more of the electromagnetic radiation sources 24 during operation. For example, the emitter 20 can include both a light source and a radio frequency source and transmit radio frequency where light transmission may be suboptimal.

In exemplary configuration, to the extent that the electromagnetic radiation source 24 permits, the beam 22 width is configured to have configured signal strength or range of signal strength in order to have less than a configured signal strength at a pre-configured distance x for a given set of environmental conditions. For example, the beam 22 can be configured with a transmission strength such that the beam 22 signal strength is approximately zero or below a threshold signal strength at distance x. Alternatively, the beam 22 may be configured for transmission where the beam 22 signal strength is a known amount at distance x for given conditions. In certain configurations, the beam 22 transmission strength is adjusted based on input for environmental conditions which would affect transmission distance. For example, a humidity sensor can provide input for rain or fog conditions that could impede light or radio wave transmission.

Optionally, the emitter 20 is configured to direct the beam 22 in response to turning conditions of the vehicle. The emitter 20 can receive steering wheel use, position data, accelerometer, global positioning system (GPS) data, or other similar sensing to detect a turn condition. In response, the emitter 20 employs a beam director 23 to alter the beam 22 direction proportionate to the turn angle of the vehicle, as shown in vehicle 08. In an alternate configuration, the emitter 20 is deactivated during a turn condition.

In certain embodiments, the emitter 20 encodes data into the beam 22. One such data element that the beam 22 can incorporate is relay count data, which facilitates peer to peer, vehicle to vehicle network type communication. That is to say a "chain" of vehicles relay data as nodes. Relay count data facilitates configurable conditional signal transmission through the vehicular chain. A base relay count can be provided by the receiver 40, as will be disclosed below. Relayed data through the vehicular chain is variable. For example, a total relay count is the number of vehicles that have relayed a signal (ie a "hop count"). In such a situation, the emitter 20 can increment the received active relay count data prior to encoding for transmission to trailing vehicles. An active relay count is the instantaneous number of signal use conditions, such as activated vehicle signals, within range of one or more vehicle to vehicle communication systems 10 in the chain. In exemplary usage scenarios, active relay count is the number of vehicles in the same lane in front of the subject vehicle with activated vehicle signal lights, such as applying brakes or turn signals.

In certain configurations, other data is encoded in the beam 22, such as a car identifier, accelerometer data, velocity data, directional data, GPS data, lane indication data, other data from the subject vehicle, other vehicle(s) signal relay systems 10 data, or derived data can be encoded within the beam 22. The received data for encoding can include sources from the vehicle computer, sensors, portable computers of a vehicle occupant, or other vehicle to vehicle communication systems 10. For example, the beam 22 can incorporate inter-vehicle distance data, such as that between the leading vehicle and the subject vehicle from a range sensor system. Moreover, the vehicle to vehicle communication systems 10 can process the data prior to encoding. To illustrate, the emitter 20 can accumulate the distance data of leading vehicles and add distance between the subject vehicle and leading vehicle for encoding and transmission.

Referring to FIG. 3, the emitter 20 is in communication with the receiver 40 via a cable 18 or wirelessly 18'. In certain configurations, the receiver 40 is operable to monitor, receive, and decode beams of the emitters 20 of similarly configured vehicle to vehicle communication systems 10 of other vehicles. During monitoring, the receiver 40 monitors receipt of a beam 22 at an antenna 44 or light sensor 42. Upon receipt of a beam 22, the receiver 40 optionally determines signal strength. Where the signal strength of the beam 22 is lower than a pre-determined threshold, the receiver 40 may cease further signal or relay processing steps.

The receiver 40 decodes the data of the beam 22 of a leading vehicle, including the relay count and other data. The decoded data is stored for retrieval and use by the emitter 20, the notification system of the vehicle 08, vehicle computer, or other systems. In one configuration, the receiver 40 signals the notification system of the vehicle 08, where the notification system activates a signal to alert the driver of the subject vehicle via a dash indicator or window display, optionally signaling the active relay count. In yet another configuration, the receiver 40 conditionally transmits a notification or beam data when the relay count is less than a pre-configured threshold. In another configuration, the receiver 40 transmits the decoded data to a display or vehicle computer. In yet another configuration, the receiver 40, outputs a control signal for an automated vehicle control system input. In another configuration, the receiver 40 communicates the active relay count and other data to the emitter 20, optionally incrementing the relay count. When beam 22 transmission and receipt terminates or is below the threshold, receiver 40 post-beam processing activity terminates. The receiver 40 then can indicate a non-signal or below threshold state.

Figure 4:
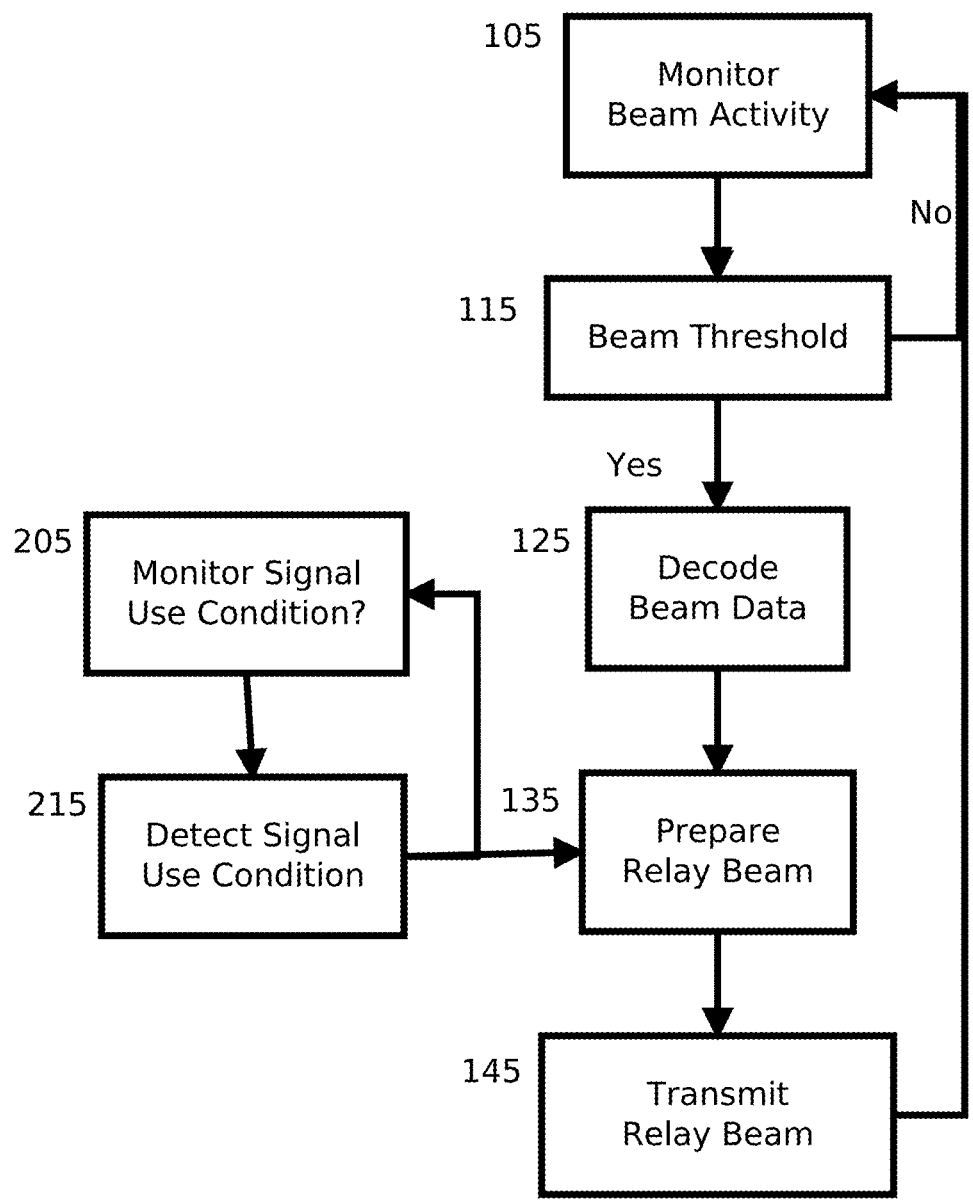
FIG. 4 illustrates an embodiment of a process implemented to the system of FIG. 1.

Having described elements of the vehicle to vehicle communication system 10, representative methods of operation are disclosed. FIG. 5a depicts a leading vehicle 1, a first trailing vehicle 2, and a second trailing vehicle 3, driving in a lane in sequence and each equipped with a vehicle to vehicle communication system 10. FIG. 4 depicts a process of an embodiment of the vehicle to vehicle communication system 10 in operation.

A leading vehicle's 1 vehicle to vehicle communication system 10 monitors for a signal use condition of the vehicle 1 205. Upon detection of a signal use condition 215, the vehicle to vehicle communication system 10 prepares a beam and transmits a beam for transmission 135 145. FIG. 5b illustrates the leading vehicle 1 with an activated brake signal and a simultaneous beam 22 of pre-configured width and signal strength. Below is the state of leading vehicle 1 in a braking signal use condition and its vehicle to vehicle communication system 10.

| Signal Use Condition | Signal Activated? | Beam Activated? | Total Relay Count | Active Relay Count | Leading Vehicle Signaling? |
|---|---|---|---|---|---|
| True | Brake | True | 0 | 0 | n/a |

The receiver 40 of first trailing vehicle 2 monitors for beam 22 activity from leading vehicles 1 equipped with similarly configured vehicle to vehicle communication systems 105. As described above, a signal use condition of a brake light and beam 22 of pre-configured width and signal strength is activated from the leading vehicle 1. Beam 22 is received by the first trailing vehicle 2 and the receiver 40 determines whether the beam 22 signal strength threshold is reached 115. If the beam 22 signal strength threshold is reached, the beam 22 data is decoded, displayed, and/or communicated to the emitter 125. In one configuration, the emitter 20 of the subject vehicle 2 activates its visual signal in response. The emitter 20 prepares beam data 135, retrieving and processing the necessary data. It increments the total relay count, conditionally incrementing active relay count with input from the receiver 205 215, retrieves the car identifier, and appends other data for encoding. The encoded beam 22 is transmitted 145. As illustrated in FIG. 5c, notifications of the brake light signal use condition of the leading vehicle 1 is shown in the trailing vehicles 2 3. Below is the state of first trailing vehicle 2 and its vehicle to vehicle communication system 10.

| Signal Use Condition | Signal Activated? | Beam Activated? | Total Relay Count | Active Relay Count | Leading Vehicle Signaling? |
|---|---|---|---|---|---|
| False | False | True | 1 | 1 | True |

The receiver 40 of second trailing vehicle 2 monitors for beam 22 activity from leading vehicles, in this scenario vehicle 2, equipped with similarly configured vehicle to vehicle communication systems 105. As described above, a signal use condition of a brake light and beam 22 of pre-configured width and signal strength is activated from the leading vehicle 1 and first trailing vehicle 2 transmits a relay signal 22 of the leading vehicle 1 signal use condition. Beam 22 is received by the second trailing vehicle 3 and the receiver 40 determines whether the beam 22 signal strength threshold is reached 115. The beam 22 data is decoded, displayed, and/or communicated to the emitter 125. In this scenario, the vehicle to vehicle communication system 10 is configured to only transmit relay beams 22 where the total relay count is less than or equal to one, thus it does not prepare beam data or transmit a beam 22. Below is the state of second trailing vehicle 3 and its vehicle to vehicle communication system 10.

| Signal Use Condition | Signal Activated? | Beam Activated? | Total Relay Count | Active Relay Count | Leading Vehicle Signaling? |
|---|---|---|---|---|---|
| False | False | False | 2 | 1 | True |

Figure 6:
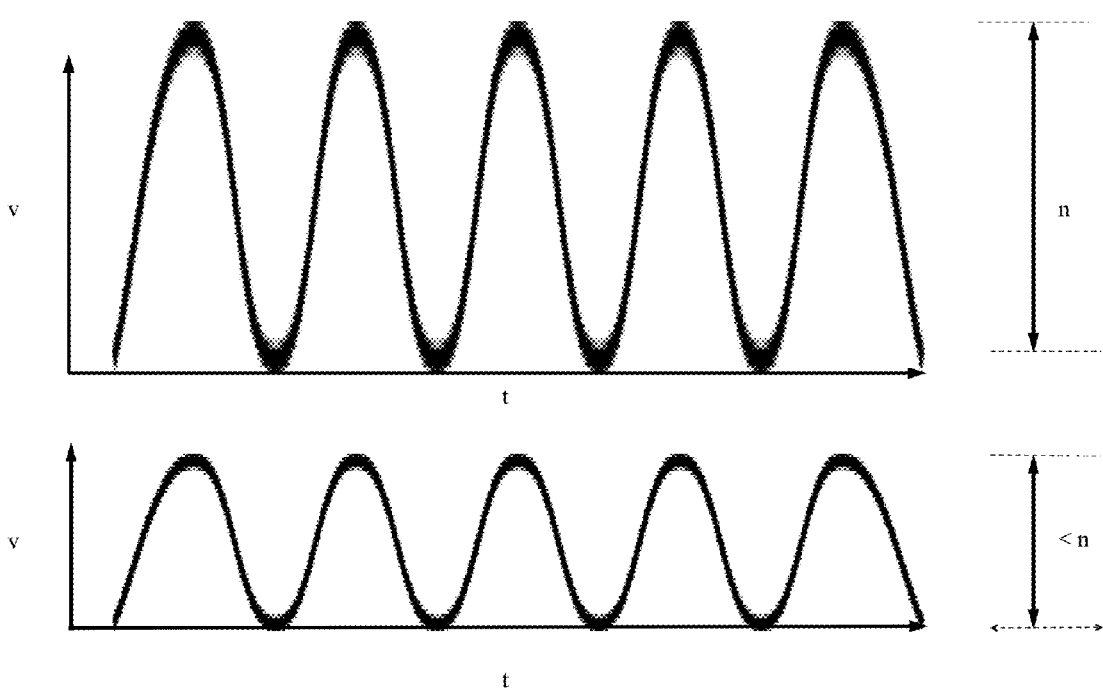
FIG. 6 illustrates traffic analysis module aggregate traffic data and suggested traffic signals.
Figure 7A:
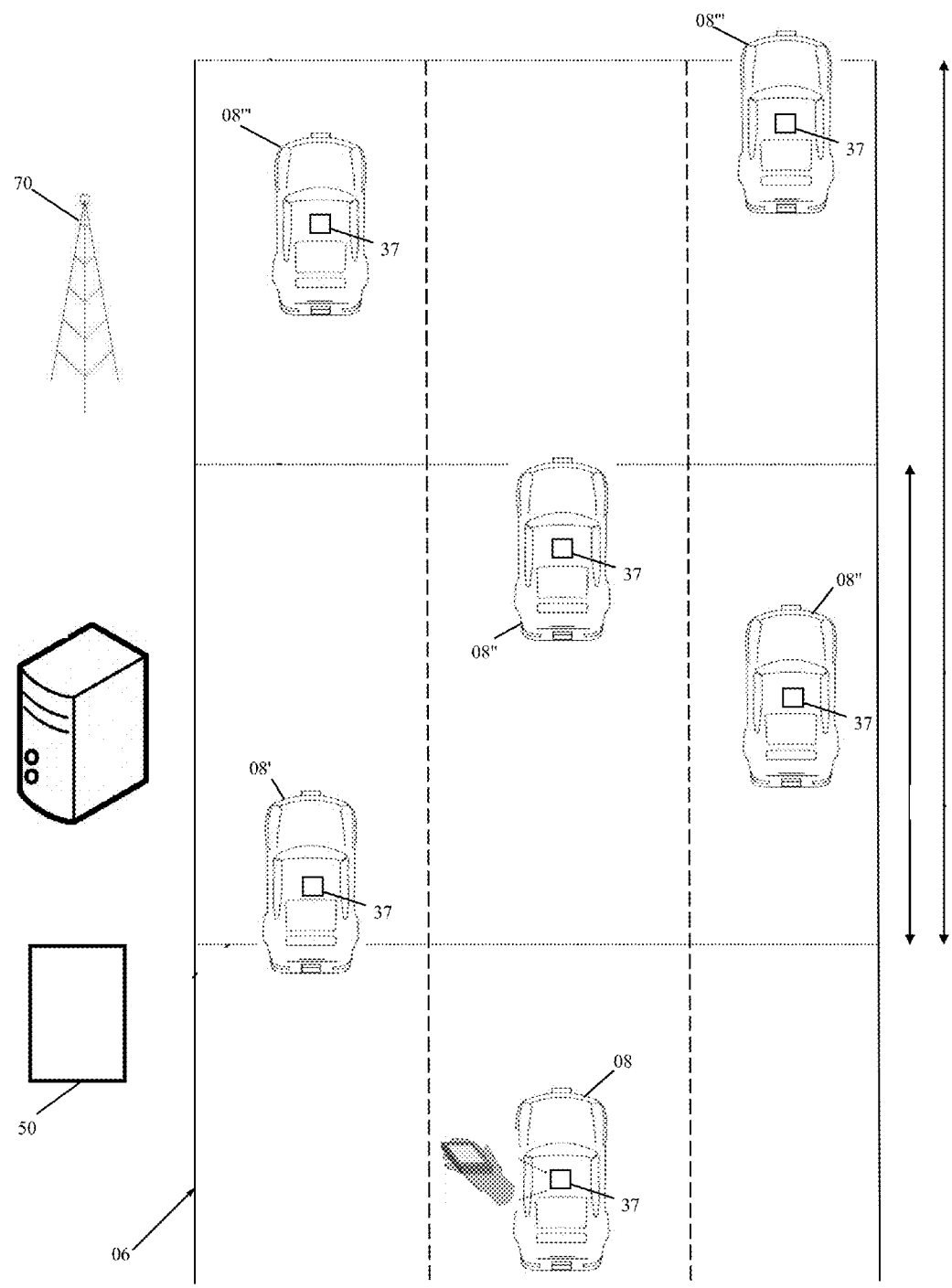
FIGS. 7a and 7b illustrate top view diagrams of embodiments of traffic analysis module systems as they may exist in operation.
Figure 7B:
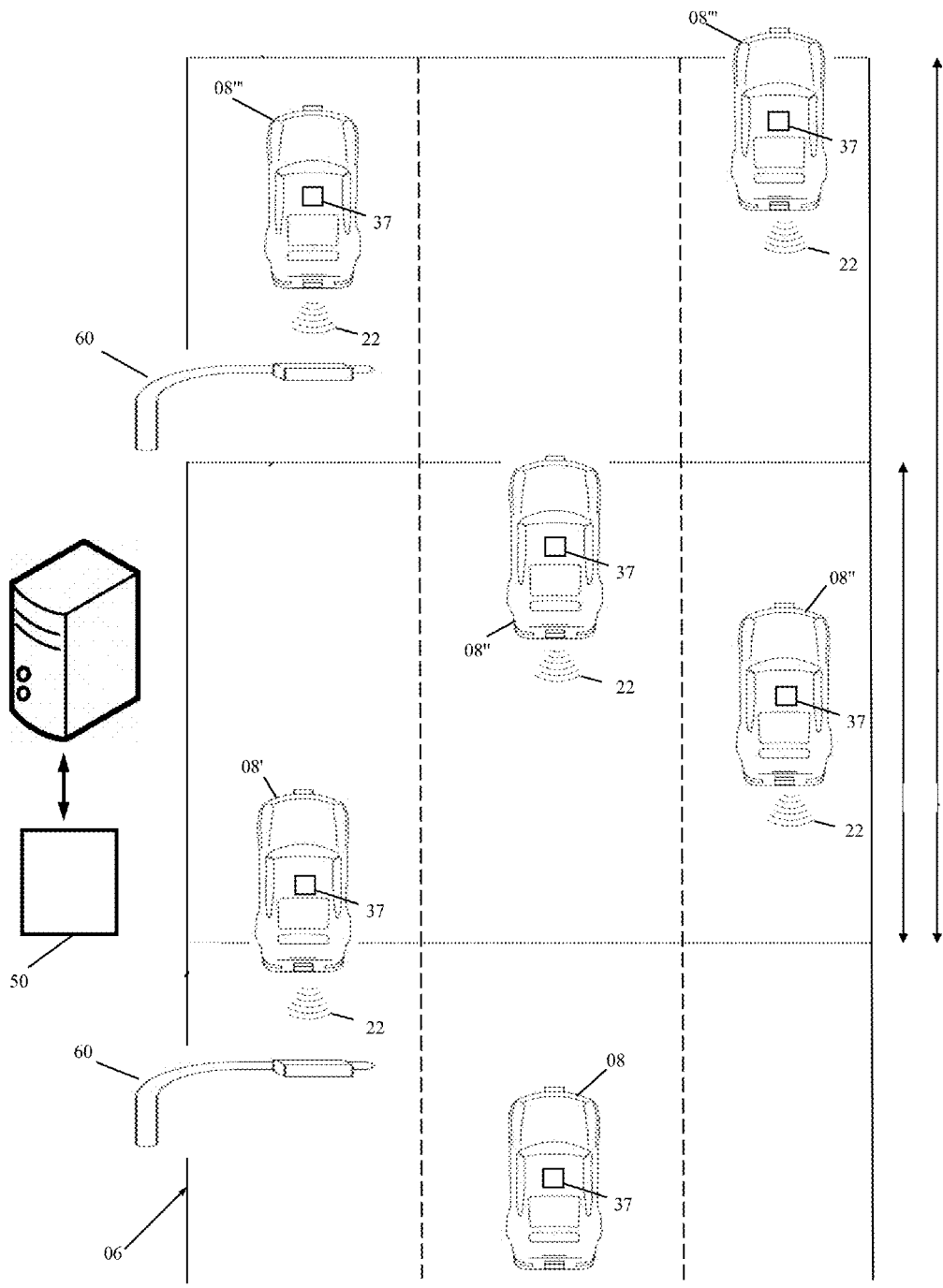
Figure 8:
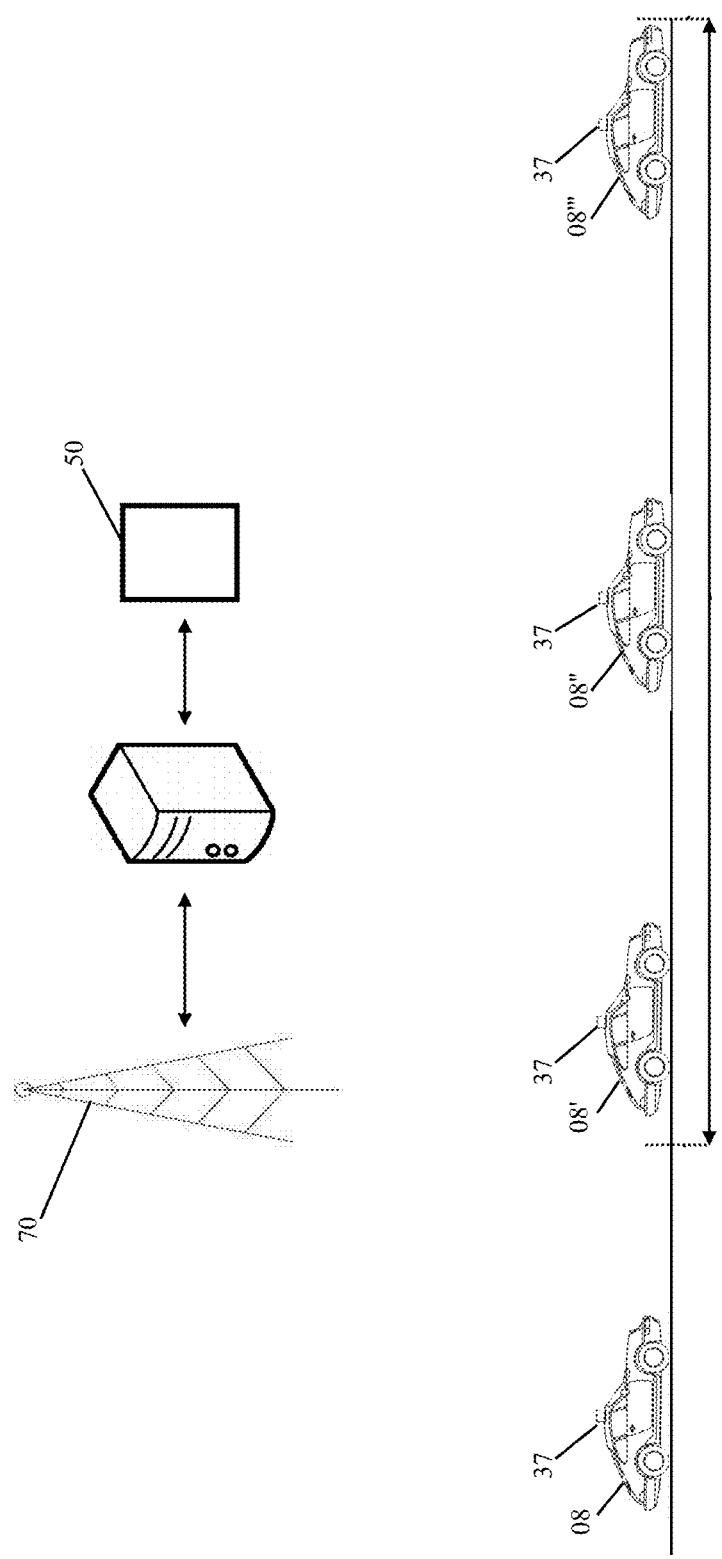
FIG. 8 illustrates a side view diagram of an embodiment of a traffic analysis module system as it may exist in operation.
Figure 9:
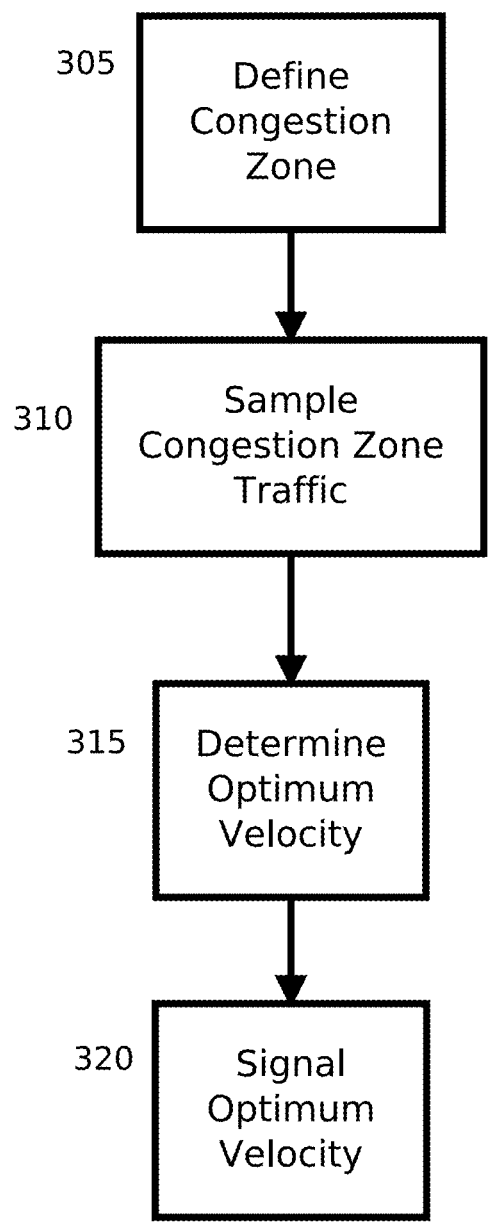
FIG. 9 illustrates an embodiment of a process of traffic analysis.

Now referring to FIGS. 1 and 6, in an alternate embodiment, the invention further includes a traffic analysis module 50 for traffic analysis of a plurality of vehicles 08 equipped with vehicle to vehicle communication systems 10 in a traffic zone. In exemplary operation, the traffic analysis module 50 conditionally transmits instructions in response to the traffic analysis. The traffic analysis module 50 includes a processor and memory. The traffic analysis module 50 defines one or more traffic zones to be monitored, a zone through which a plurality of vehicles 10 equipped with vehicle to vehicle communication systems 10 may pass. The traffic analysis module 50 receives beam 22 data from the vehicle to vehicle communication systems 10 of the vehicles or other sources. It should be appreciated that this communication may be in-band or out-of-band with the beam data 22 communications disclosed above. The traffic analysis module 50 associates position data with a particular vehicle 08 in order to confirm presence in the traffic zone. Optionally, the traffic analysis module 50 determines a position or relative position of a particular vehicle within the traffic zone.

Referring to FIG. 1, in one configuration, the traffic analysis module is in communication with at least one tower 60, and in exemplary configuration, a plurality of towers 60 in communication with each other and disposed at known locations within and adjacent the traffic zone. The exemplary tower 60 includes a traffic module receiver 40' and traffic module emitter 20' similar to those disclosed above. The receiver 40' and emitter 20' are preferably mounted above the vehicle heights for improved beam 22 reception by line of sight to plural vehicles. Optional configurations of the signal use emitter 20' include widened beam 22 width and increased signal transmission strength for multi-vehicle transmissions. In alternate configurations, the position data of a particular vehicle to vehicle communication system 10 is based on an associated GPS, an associated portable computer, an associated portable phone and cell phone tower 70, or similar systems.

The traffic analysis module 50 processes received vehicular signal system 10 data for suboptimal traffic conditions, such as frequent sharp velocity changes or frequent signal use conditions. The module 50 may receive beam 22 data of a single vehicle 08, a sample of vehicles 08, or larger data set(s) of vehicles 08 within the traffic zone for analysis. In one configuration, the traffic analysis module 50 processes the velocity of the vehicles in the traffic zone and calculates peak to trough variations n over time, a representation of which is shown in the upper graph of FIG. 6. In an alternate configuration, the traffic analysis module 50 processes the number of active signal conditions over time. To illustrate, the module 50 may use the number of active brake lights per second within the traffic zone.

The traffic analysis module 50 optionally determines suggested instructions for optimizing traffic within the traffic zone, vehicles at the perimeter of the traffic zone, vehicles just adjacent and entering the traffic zone, or traffic control signals in or adjacent the traffic zone. The instructions correlate to the method employed to determine the suboptimal traffic condition. For example, in the disclosed peak to trough velocity analysis, the traffic analysis module may send suggested deceleration signals in order to decrease the peak to trough velocity and "flatten the curve," as shown in the bottom graph of FIG. 6. In the disclosed simultaneous active signal process, the module 50 can also suggest deceleration signals. The method of communicating the suggested instructions varies. Representative methods includes a visual signal proximate the tower 60, a signal from the emitter 40' of the tower 60 to subject vehicles, a message to a portable computer associated with the vehicle, a message from the cell phone tower 70 to a phone associated with the vehicle, or the like.

Figure 10:
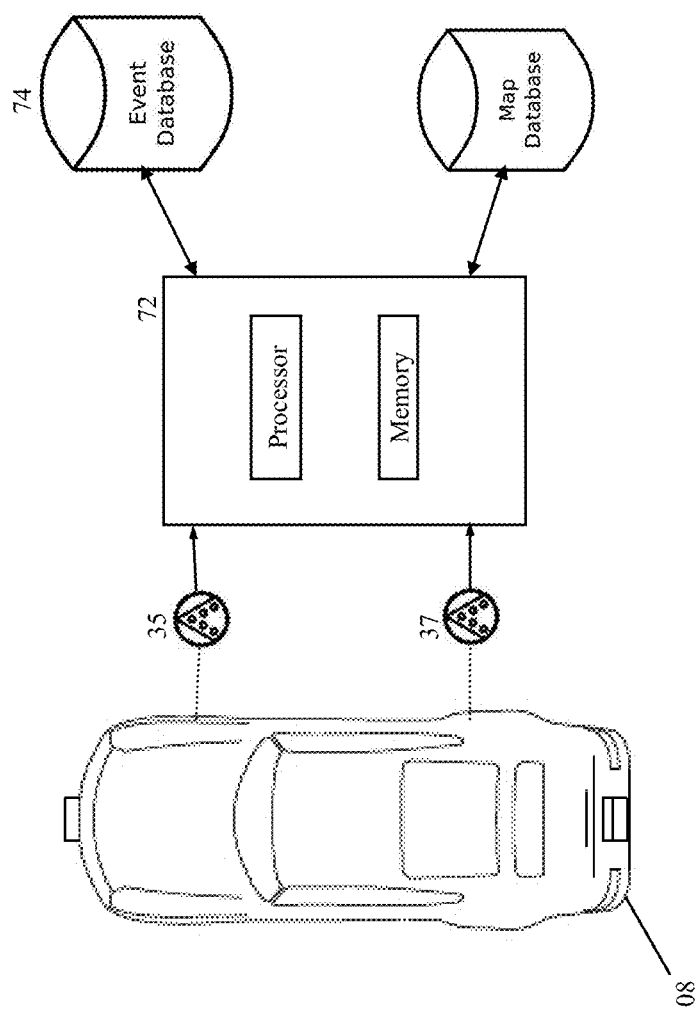
FIG. 10 illustrates an embodiment of a system for driver behavior monitoring.
Figure 11:
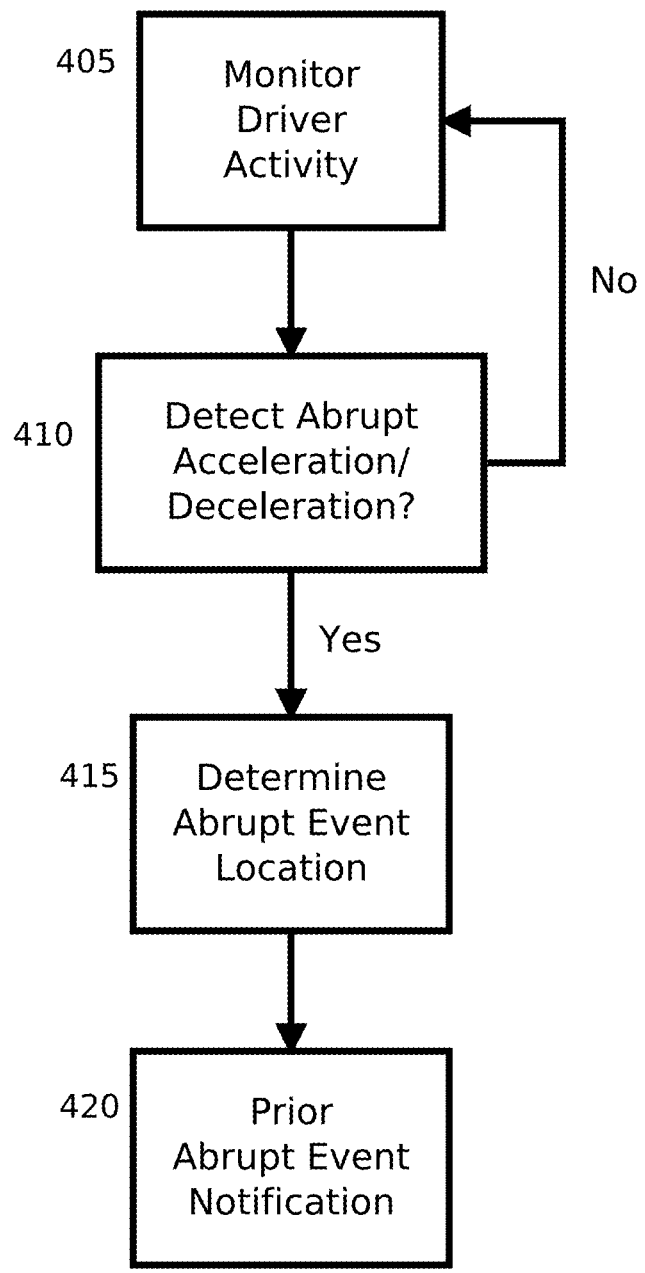
FIG. 11 illustrates an embodiment of a process of driver behavior monitoring.

Now referring to FIG. 10, alternate embodiments of systems and processes for monitoring driver behavior are disclosed, specifically systems and processes for monitoring abrupt deceleration or acceleration. A vehicle 08 having an associated computer 72 is monitored for abrupt deceleration or acceleration. Certain embodiments of the vehicle monitoring system include a computer 72, sensors 35 37, and an event database 74. An exemplary process for monitoring abrupt deceleration or acceleration is depicted in FIG. 11. The acceleration/deceleration activity of the vehicle is monitored 405. Using the acceleration/deceleration activity as input, the system monitors for an abrupt acceleration/deceleration event 410. Upon an abrupt acceleration/deceleration event, the abrupt event location is determined 415. Notifications of prior abrupt acceleration/deceleration events are provided 420. More consideration of each of the steps will be considered below.

Exemplary processes of the embodiments are on computers or microelectronics. For instance, the computer 72 may be implemented using one or more personal computers (PCs), servers, mobile devices (e.g., a smartphone), tablet devices, and/or any other appropriate devices. The various devices may work alone or in conjunction (e.g., some components of the computer system may be provided by a mobile device while other components are provided by a server). Certain processes and modules described above may be implemented as software processes that are specified as at least one set of instructions recorded on a non-transitory storage medium. When these instructions are executed by one or more computational element(s) (e.g., microprocessors, microcontrollers, application-specific integrated circuits (ASIC), field programmable gate arrays (FPGA), etc.) the instructions cause the computational element(s) to perform actions specified in the instructions.

At step 405, vehicle 08 activity is monitored, specifically acceleration/deceleration activity of a driver is monitored 405. Acceleration or deceleration activity occurs during driving activity such as increasing speed, braking, turning, or shifting gears. A sensor module 76 operable to receive data from one or more sensors receives input from sensors in order to directly or indirectly detect and measure instantaneous acceleration or deceleration or velocity. Various sensors 35 37 may be used to determine the various driving activities indicating acceleration and deceleration. Sensor 35 37 input is received. In certain configurations, sensors 35 37 are affixed directly to the vehicle 08. In certain configurations, sensors 35 37 are effectively paired with the driver of the vehicle 08, such as the driver carrying a portable computer 72.

Representative sensors may include inertial sensors 35 (e.g. accelerometers, gyroscopes, and the like), wheel speed sensors, differential speed sensors, global navigation satellite systems such as GPS 37, and/or any other appropriate sensors. The sensors may provide information related to the vehicle, such as speed, odometer readings, rotations per minute, pedal position (e.g., gas or brake), gear position, or other direct or indirect measures of location or velocity.

The sensors may be adapted to communicate with the sensor module 76 in various appropriate ways such as a local bus, a controller area network bus, wireless communication links, on board diagnostics (OBD) ports, third party software modules, or other suitable communication systems. For example, the sensors may be included in the vehicle 08 and communicated over the OBD port. Alternatively, the sensors may be included in a smartphone 72 and communicated locally. In yet another example, the sensors may be included in a retrofit system for the vehicle 08 and communicated wirelessly.

In certain configurations, the sensor module 76 provides output in the form of raw sensor values. In certain configurations, the sensor module 76 provides output in the form of the received sensor data converted into speed, inertia, location, or other values for later processing. In certain configurations, the sensor module 76 provides output in the form of a curve, the curve representing values over time.

Using the input of acceleration and deceleration activity, the vehicle monitoring system monitors for an abrupt deceleration event 410. A stop detection module 78 is adapted to process sensor module 76 data and detect an abrupt acceleration or deceleration event. The stop detection module 78 receives and processes the sensor data from the sensor module 76 in order to determine an abrupt acceleration or deceleration event.

In certain configurations, the stop detection module 78 compares the sensor data against threshold values. The stop detection module 78 may compare a single received instantaneous acceleration or deceleration sensor data values, such as accelerometer 35 output, against threshold values. Threshold values may be defined as a threshold g value (acceleration of gravity). For example, stop detection module 78 may determine an abrupt deceleration event exists where the deceleration is greater than 0.4 g. In other configurations, the stop detection module 78 may determine an abrupt deceleration event exists where the deceleration is greater than 0.75 g, 1.0 g, or other suitable values. The stop detection module 78 may compare plural received acceleration or deceleration sensor data values against an evaluation deceleration curve. Such comparison may result in identification and quantification of various differences between the evaluation curve and the subject curve. Such comparison may compare relative peaks or overlap regions of the respective curves. Suitable deceleration curves are those which indicate an undesirable deceleration, such as a certain slope or pattern.

In other configurations, the stop detection module 78 may compare velocity changes over time, such as post-processed GPS 35 output, against threshold values. Threshold values may be defined as a threshold change in speed, such as a change in miles per hour (MPH) per second. For example, the stop detection module 78 may determine an abrupt deceleration event exists where the velocity change is greater than 4 MPH/s (−4 MPH/s). In other configurations, the stop detection module 78 may determine an abrupt deceleration event exists where the deceleration is greater than 7 MPH/s, 10 MPH/s, or other suitable values. The stop detection module 78 may compare plural received velocity changes against an evaluation velocity change curve. Such comparison may result in identification and quantification of various differences between the evaluation curve and the subject curve. Such comparison may regions relative peaks or overlap regions of the respective curves. Suitable velocity change curves are those which indicate an undesirable velocity change, such as by a certain slope or pattern.

Upon an abrupt acceleration or deceleration event, the abrupt event location is determined 415. A location module 79 is operable to determine the location of the vehicle 08, commonly in the form of latitude and longitude, simultaneous with the abrupt acceleration or deceleration event. In certain configurations, the location module 79 receives position information from sensors such as the GPS 37 in order to determine the location. In certain configurations, the location module 79 receives position information from third party software modules.

The position information of the abrupt acceleration or deceleration event is stored to the event database 74. In certain configurations, a timestamp for the abrupt acceleration or deceleration event, a driver identifier, a vehicle identifier, group identifier, and other data are associated with the abrupt acceleration or deceleration event and stored in the event database 74 as an event record.

Notifications of prior abrupt stop events are provided 420. A notification module 79 is operable to notify a driver of prior abrupt acceleration or deceleration events. The notification module 79 retrieves event records from the event database 74 and generates a positional notification. One or more abrupt acceleration or deceleration event records are retrieved from the event database 74 for notifications. The retrieved events may be selected by location, driver identifier, a vehicle identifier, a group identifier, time and/or other available stored data of the event records.

The notification module 79 may provide real-time notifications to users. The notification module 79 may, for example, display information on a vehicle display, heads-up display, instrument cluster, dashboard, and/or other appropriate location. The notification module 79 may be adapted to emit sounds and/or voice alerts. The notification module 79 may be adapted to provide other warning methods such as seat and/or steering wheel vibration, colored and/or flashing lights, alphanumeric messages, graphic messages, and/or other appropriate alert methods. Such notifications may be based on various appropriate factors.

Figure 12B:
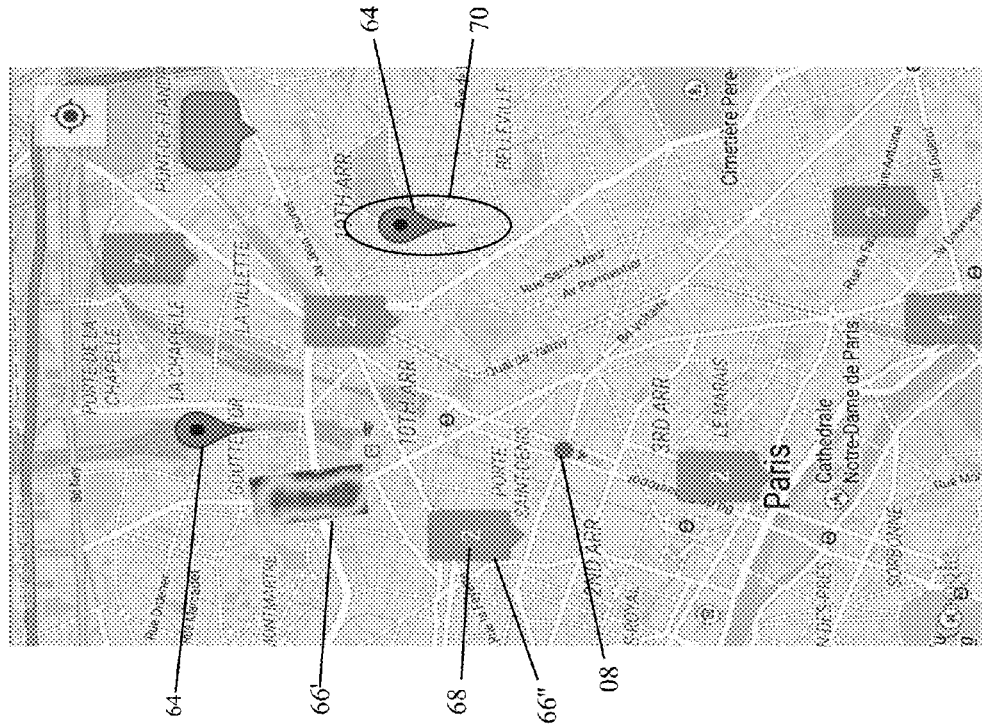
FIGS. 12A and 12B illustrate sample maps before and after driver behavior monitoring as they may exist in operation.
Figure 12A:
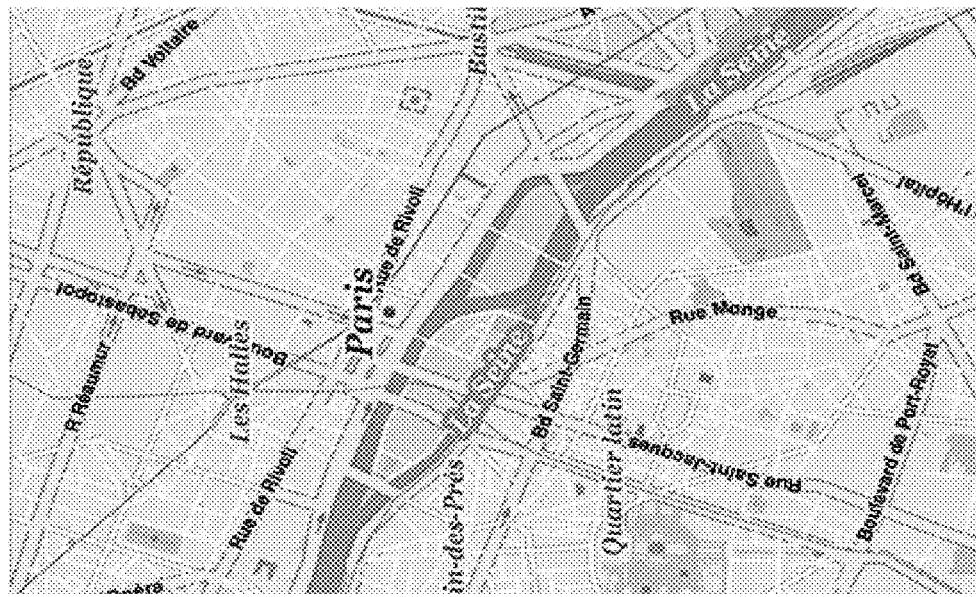

In certain configurations, the notification module 79 displays a map 62, such as that of FIG. 12A, at a certain scale or zoom level. A map database includes map data elements indicating various features associated with paths of travel for vehicles. A map database may store data related to roads and their features, and the respective locations thereof. A map database may include information such as information regarding speed limits, traffic signals and/or signage, number of travel lanes, road classes, etc. The map database may include elevation, surface type, steepness, curve radius, etc. In communication with the location module 79, the notification module 79 may receive the vehicle 08 position to match the vehicle 08 position to a position on a road segment received from the map data and correspondingly overlay the vehicle's 08 position on the map 62.

In certain configurations, the notification module 79 displays notifications 64 66 68 as overlays on a map 62 such as that of FIG. 12B. As previously disclosed, the notification module 79 retrieves one or more abrupt acceleration or deceleration event records for notification, which includes the position information for the event. In one configuration, the notification module 79 retrieves the position information for the abrupt event and overlays an indicator 64 at the corresponding position on the map 62. Where multiple retrieved events are in proximity to each other, the notification module 79 may display the plural retrieved events as a cluster 66, depending on factors such as proximity of the events, the scale or zoom level of the map, the speed of the vehicle 08, and other factors. Representative suitable cluster event displays may be in the form of a gradient 66" indicator or an indicator with an event count 68 for the cluster 66. In certain configurations, the notification module 79 generates a notification when the vehicle 08 is within a proximity region 70 of a retrieved event's location.

In example usage of a vehicle monitoring system, a user enters a vehicle 08 having a portable computer 72 with an integrated accelerometer 35 and integrated GPS 37. As the vehicle 08 travels, deceleration activity is monitored 405. The sensor module 76 receives periodic output from the accelerometer 35 and GPS 37 and processes it to determine if an abrupt deceleration event has occurred 410. If an abrupt deceleration event occurs, the location module 79 provides position information 415. The position information is stored in the event database 74. As the vehicle 08 travels, the notification module 80 retrieves selected prior abrupt events from the event database 74, retrieving the position information of the abrupt events. In communication with the location module 79, the vehicle 08 position is monitored and a map 62 is displayed in the area proximate the vehicle 08, such as the map of FIG. 12A. The maps includes indicators 64 66 of prior abrupt events overlaid at their respective position on the map 62, such as the map of FIG. 12B. Additional notifications are generated when the vehicle 08 travels within a proximity region 70 bounding a retrieved event's location.

Insofar as the description above and the accompanying drawing disclose any additional subject matter that is not within the scope of the single claim below, the inventions are not dedicated to the public and the right to file one or more applications to claim such additional inventions is reserved.

What is claimed is:

1. A system for monitoring, analyzing, and storing driver activity, the system comprising:
   a sensor module configured to receive data from one or more sensors that measure acceleration or deceleration associated with a vehicle;
   a stop detection module configured to receive said sensor module data, process said sensor module data, and determine an abrupt acceleration or deceleration event;
   a location module configured to retrieve the location of said vehicle simultaneous with said abrupt acceleration or deceleration event;
   storing said location of said abrupt acceleration or deceleration event in an event record in an event database;
   further comprising a notification module, said notification module retrieving at least one of said abrupt acceleration or deceleration event records for positional notification, wherein said notification module displays a map segment and retrieves the location information of said retrieved abrupt acceleration or deceleration event records and overlays notifications on said map segment corresponding to said retrieved abrupt acceleration or deceleration event location information;
   wherein plural of said retrieved abrupt acceleration or deceleration event notifications within a threshold proximity are grouped and displayed as single notification.

2. The system of claim 1, wherein plural of said retrieved abrupt acceleration or deceleration event notifications within a threshold proximity are grouped and displayed as a single cluster notification.

3. The system of claim 2, wherein said cluster notification is displayed as a gradient, the gradient proportional to the number of proximate retrieved abrupt acceleration or deceleration event notifications in said cluster notification.

4. The system of claim 2, wherein said cluster notification includes a numeric indicator of the number of proximate retrieved abrupt acceleration or deceleration event notifications in said cluster notification.

5. The system of claim 1, wherein said notification module retrieves the location information of said retrieved abrupt acceleration or deceleration event records;
   said notification module defines a proximity region bounding a retrieved abrupt acceleration or deceleration event location;
   said notification module periodically receives vehicle position updates from said location module; and
   said notification module generates a notification when said vehicle travels within said proximity region.

6. A system for monitoring, analyzing, and storing driver activity, the system comprising:
   a sensor module configured to receive data from one or more sensors that measure acceleration or deceleration associated with a vehicle;
   a stop detection module configured to receive said sensor module data, process said sensor module data, and determine an abrupt acceleration or deceleration event;
   a location module configured to retrieve the location of said vehicle simultaneous with said abrupt acceleration or deceleration event;
   storing said location of said abrupt acceleration or deceleration event in an event record in an event database;
   said notification module periodically receiving position updates of said vehicle from said location module, displaying a map segment, and overlaying said vehicle on said map segment corresponding its position; and
   said notification module retrieving the location information of abrupt acceleration or deceleration event records proximate said vehicle and overlaying notifications on the map corresponding to the retrieved abrupt acceleration or deceleration event location information;
   wherein plural of said retrieved abrupt acceleration or deceleration event notifications within a threshold proximity are grouped and displayed as a single cluster notification.

7. The system of claim 6, wherein said cluster notification includes a numeric indicator of the number of proximate retrieved abrupt acceleration or deceleration event notifications in said cluster notification.

8. A system for monitoring, analyzing, and storing driver activity, the system comprising:
   a sensor module configured to receive data from one or more sensors that measure acceleration or deceleration associated with a vehicle;
   a stop detection module configured to receive said sensor module data, process said sensor module data, and determine an abrupt acceleration or deceleration event;
   a location module configured to retrieve the location of said vehicle simultaneous with said abrupt acceleration or deceleration event;
   storing said location of said abrupt acceleration or deceleration event in an event record in an event database;
   said notification module periodically receiving position updates of said vehicle from said location module, displaying a map segment, and overlaying said vehicle on said map segment corresponding its position; and
   said notification module retrieving the location information of abrupt acceleration or deceleration event records proximate said vehicle and overlaying notifications on the map corresponding to the retrieved abrupt acceleration or deceleration event location information;
   wherein said notification module retrieves the location information of said retrieved abrupt acceleration or deceleration event records;
   said notification module defines a proximity region bounding a retrieved abrupt acceleration or deceleration event location;
   said notification module periodically receives position updates from said location module; and
   said notification module generates a notification when said vehicle travels within said proximity region.

* * * * *